United States Patent [19]

Bourgoin

[11] 3,832,012
[45] Aug. 27, 1974

[54] ANTISKID BRAKING CIRCUIT
[75] Inventor: Guy Bourgoin, Sceaux, France
[73] Assignee: Societe Anonyme D.B.A., Paris, France
[22] Filed: Jan. 12, 1973
[21] Appl. No.: 323,167

[30] Foreign Application Priority Data
Jan. 21, 1972  France .................. 72.2029

[52] U.S. Cl. ............. 303/21 F, 188/345, 303/6 R
[51] Int. Cl. ............................................. B60t 8/00
[58] Field of Search .......... 188/181, 345; 303/20, 21

[56] References Cited
UNITED STATES PATENTS
| 3,503,654 | 3/1970 | Stamm | 303/21 EB |
| 3,576,350 | 4/1971 | Larsen | 303/21 F |
| 3,608,979 | 9/1971 | Coyle | 303/21 EB |
| 3,703,319 | 11/1972 | Ingram et al. | 303/21 F |

Primary Examiner—Trygve M. Blix
Assistant Examiner—Stephen G. Kunin
Attorney, Agent, or Firm—Ken C. Decker; William N. Antonis

[57] ABSTRACT

An anti-skid braking circuit for a vehicle having two independent braking circuits, a first circuit including the main brake actuators of the front wheels and a second circuit including supplementary brake actuators of the front wheels and the brake actuators of the rear wheels. Each front wheel is equipped with a speed sensor connected on one hand with an electronic anti-skid logic monitoring a fluid pressure modulator associated with the corresponding main actuator, and on the other hand with another electronic anti-skid logic monitoring another modulator controlling the fluid pressure in the second circuit. The rear wheels of the vehicle are equipped with speed sensors also connected to the other anti-skid logic.

2 Claims, 1 Drawing Figure

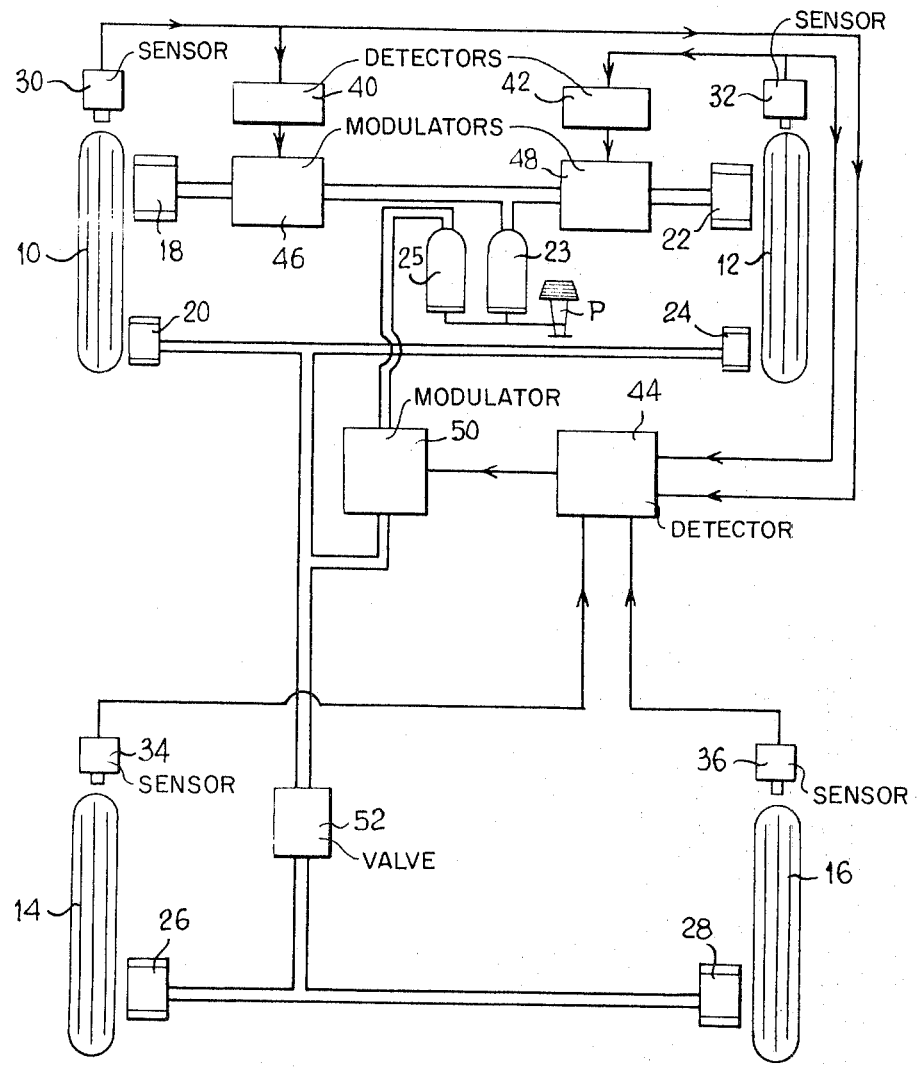

ANTISKID BRAKING CIRCUIT

The invention relates to an anti-skid braking circuit operated by means of pressure fluid and intended for a motor vehicle.

More particularly, the invention relates to an anti-skid braking circuit operated by means of pressure fluid, for a vehicle having a first and a second set of wheels, of the type in which each wheel in the first set is equipped with a main brake actuator, a supplementary brake actuator, a speed sensor, an electronic anti-skid logic circuit and a fluid-pressure modulator for modulating the fluid pressure acting on the main actuator, each wheel in the second set is equipped with a speed sensor and at least one secondary brake actuator, the main actuators being supplied from a first pressure fluid source by way of a first circuit, the supplementary and secondary actuators being supplied by a second pressure fluid source by way of a second circuit independent of the first circuit, the second set of wheels being equipped as a whole with an electronic anti-skid logic circuit and with a fluid-pressure modulator for modulating the fluid pressure acting on the secondary actuators.

In known anti-skid braking circuits of this type an independent pressure modulator is provided for each of the main and supplementary actuators for the first set of wheels. If, for example, the vehicle concerned has four wheels and a double braking circuit on the front wheels, this arrangement necessitates a total of three electronic logic elements and five pressure modulators, which makes it complicated and expensive. Controlling each front wheel independently also has the disadvantage that if adhesion to the ground on one side is different from that on the other the braking drag is very uneven, which tends to render the vehicle unstable and to transmit a violent reaction to the steering wheel.

To avoid these disadvantages, the invention proposes an anti-skid braking circuit of the type described, characterised in that the speed sensors associated with the wheels in the first set are connected to the logic circuit belonging to the second set, and the modulator for the second set modulates, in addition to the fluid pressure acting on the secondary actuators, the fluid pressure acting on the supplementary actuators.

Obviously, the use of the invention means that in the example given the total number of modulators is reduced to three, and also that the circuit as a whole is much simpler.

Furthermore, the instability and the reaction transmitted to the steering wheel are much reduced, since for each front wheel the pressure in the main cylinder is modulated as a function of the adhesion of the first of the four wheels which threatens to lock. The differences in drag on the front wheels are therefore reduced, the overall efficiency of the circuit is substantially improved, and also the variations in the braking torque at each front wheel are smaller since independent control of the pressures in the main and supplementary cylinders gives rise to some compensation. The reactions transmitted to the steering wheel are therefore far weaker.

The invention will be better understood from the ensuing description referring to the accompanying drawing, in which the single FIGURE represents an anti-skid braking circuit embodying the invention, mounted on a four-wheel vehicle.

The FIGURE shows two wheels 10, 12 corresponding, for example, to the front axle of a vehicle (not shown). The wheel 10 is provided with a main brake actuator 18 and a supplementary brake actuator 20, and the wheel 12 with a main brake actuator 22 and a supplementary brake actuator 24. Two other wheels 14, 16 belonging, for example, to the rear axle (not shown) are provided with respective secondary brake actuators 26 and 28. The main actuators 18, 22 are supplied through a suitable circuit by a pressure fluid control source 23, operated by a pedal P. The supplementary actuators 20, 24 and the secondary actuators 26, 28 are supplied by another pressure fluid control source 25 (operated by the same pedal P) by way of another circuit independent of the first circuit.

Respective speed sensors 30, 32, 34 and 36 are associated with each wheel 10, 12, 14 and 16. The sensor 30 feeds to an electronic logic circuit 40 a signal representing the speed of the wheel 10, and if this wheel is threatening to lock, this logic circuit 40 supplies a signal to relax the fluid pressure to a pressure modulator 46 belonging to the main actuator 18.

Similarly, the wheel 12 is provided with the sensor 32, an electronic logic circuit 42 and a pressure modulator 48 associated with the main actuator 22. Signals representing the speeds of the wheels 14 and 16 are delivered by the sensors 34, 36 respectively to an electronic logic circuit 44, which in turn, if either or both of the wheels 14, 16 is threatening to lock, sends a signal to relax the fluid pressure to a pressure modulator 50 associated with the secondary actuators 26, 28.

The sensors 30, 32, 34 and 36, the logic circuits 40, 42 and 44 and the modulators 46, 48 and 50 may all be of any known type.

In accordance with the invention the sensors 30 and 32 are connected like the sensors 34, 36 to the logic circuit 44, and the pressure modulator 50 acts not only on the secondary actuators 26, 28 but also on the supplementary actuators 20, 24.

This obviates the expensive known arrangement in which each of the supplementary actuators 20, 24 has a separate modulator controlled by the logic circuits 40 and 42, respectively.

Moreover, as will be obvious to any person skilled in the art, the alternate brake-application and brake-release stresses applied to the wheels 10 and 12 during operation of the anti-skid system are much lower than they would be if each of the supplementary actuators 20, 24 were equipped with its own modulator. Furthermore, the reactions to these alternating stresses which are transmitted along the vehicle's steering linkage to the steering wheel (if the wheels 10, 12 are the direction-controlling wheels of the vehicle) are of lower intensity with a circuit embodying the invention than with the known circuits, since the main actuators 18, 22 subjected only to the dynamics of the wheels 10, 12, respectively whereas the supplementary actuators 20, 24 are subjected to the dynamics of one of the four wheels 10, 12, 14 and 16, so assisting both damping of the variations in the forces braking the wheels 10 and 12 and control of the steering by the driver during anti-skid braking.

Lastly, in accordance with the invention, braking-pressure correction means 52, responding, for example, to the load on the wheels 14 and 16, may be inserted between the modulator 50 and the secondary actuators 26, 28 to compensate for the weight transfer during braking.

What is claimed is:

1. In a vehicle having a pair of axles, a pair of wheels on each of said axles, braking means for controlling each of said wheels, a pair of primary brake actuating means for controlling the brakes on one of said axles, secondary brake actuating means for controlling the brakes on the other axle, a pair of supplementary brake actuating means for assisting each of said primary brake actuating means for controlling the brakes on said one axle, a first hydraulic system for actuating said primary brake actuating means and a second hydraulic system for actuating conjointly said secondary brake actuating means and said supplementary brake actuating means, an adaptive braking system comprising a wheel speed sensor for each of said wheels, each of said wheel speed sensors generating a signal proportional to the rotational velocity of a corresponding vehicle wheel, a first modulator in said first hydraulic system controlling fluid communication to one of said primary actuators and not affecting any of said secondary or supplemental brake actuating means, a first logic circuit responsive to the signal generated by the wheel speed sensor responsive to the wheel controlled by said one primary actuator to generate a signal actuating said first modulator when an incipient skidding condition of the corresponding wheel is sensed, a second modulator in said first hydraulic system controlling fluid communication to the other primary actuator and not affecting any of said secondary and supplemental actuators, a second logic circuit responsive to the signal generated by the wheel speed sensor responsive to the wheel controlled by said other primary actuator to generate a signal actuating said second modulator when an incipient skidding condition of the corresponding vehicle wheel is sensed, a third modulator in said second hydraulic system controlling fluid communication to each of said secondary actuators and each of said supplementary actuators, a third logic circuit connected to each of said wheel speed sensors and responsive thereto to actuate said third modulator whenever an incipient skidding condition is sensed in any of the vehicle wheels.

2. The invention of claim 1; and
valve means for connecting the pressure communicated to said secondary actuators in said second hydraulic system between the outlet of said third modulator and said secondary brake actuating means.

* * * * *